United States Patent
Lee et al.

(10) Patent No.: US 12,200,565 B2
(45) Date of Patent: Jan. 14, 2025

(54) BEAM DOMAIN BASED LOCALIZATION SYSTEM AND METHOD AND NON-TRANSITORY COMPUTER READABLE MEDIUM

(71) Applicant: National Yang Ming Chiao Tung University, Hsinchu (TW)

(72) Inventors: Ta-Sung Lee, Hsinchu (TW); Ming-Chun Lee, Hsinchu County (TW); Chia-Hung Lin, Tainan (TW); Chia-Hsing Yang, Taichung (TW)

(73) Assignee: National Yang Ming Chiao Tung University, Hsinchu (TW)

( * ) Notice: Subject to any disclaimer, the term of this patent is extended or adjusted under 35 U.S.C. 154(b) by 359 days.

(21) Appl. No.: 17/808,102

(22) Filed: Jun. 21, 2022

(65) Prior Publication Data
US 2023/0319500 A1 Oct. 5, 2023

(30) Foreign Application Priority Data
Mar. 31, 2022 (TW) ................... 111112700

(51) Int. Cl.
*H04W 4/021* (2018.01)
*H04W 4/33* (2018.01)

(52) U.S. Cl.
CPC ............. *H04W 4/021* (2013.01); *H04W 4/33* (2018.02)

(58) Field of Classification Search
CPC .................... H04W 4/021; H04W 4/33
See application file for complete search history.

(56) References Cited

U.S. PATENT DOCUMENTS

| | | | |
|---|---|---|---|
| 9,622,047 B1 | 4/2017 | Gu et al. | |
| 2016/0061933 A1* | 3/2016 | Chung | G01S 5/0226 455/456.1 |
| 2016/0323717 A1* | 11/2016 | Friday | G01S 5/0278 |
| 2016/0323754 A1* | 11/2016 | Friday | H04W 16/28 |
| 2021/0160704 A1* | 5/2021 | Aksu | H04W 4/025 |
| 2021/0234591 A1* | 7/2021 | Eleftheriadis | H04B 7/0626 |
| 2022/0014933 A1 | 1/2022 | Moon et al. | |

FOREIGN PATENT DOCUMENTS

CN 111818452 A 10/2020

OTHER PUBLICATIONS

Manikanta Kotaru et al., "SpotFi: Decimeter Level Localization Using WiFi", ACM SIGCOMM Computer Communication Review, 2015, pp. 269-282.

(Continued)

*Primary Examiner* — Nguyen T Vo
(74) *Attorney, Agent, or Firm* — CKC & Partners Co., LLC (57) ABSTRACT

The present disclosure provides a beam domain based localization system, and the beam domain based localization system includes a wireless transceiver and a computer device. The computer device electrically connected to the wireless transceiver, and the computer device configured for: obtaining a beam selection result associated with a mobile device through the wireless transceiver; locating the mobile device according to the beam selection result.

9 Claims, 5 Drawing Sheets

(56) References Cited

OTHER PUBLICATIONS

Zheng Wu et al., "A Fast and Resource Efficient Method for Indoor Positioning Using Received Signal Strength", IEEE Transactions on Vehicular Technology, vol. 65, No. 12, Dec. 2016, pp. 9747-9758.
Han Zou et al., "A Robust Indoor Positioning System Based on the Procrustes Analysis and Weighted Extreme Learning Machine", IEEE Transactions on Wireless Communications, vol. 15, No. 2, Feb. 2016, pp. 1252-1266.
Chen et al., "Time-Reversal Indoor Positioning With Centimeter Accuracy Using Multi-Antenna WIFI", 2016 IEEE Global Conference on Signal and Information Processing (GlobalSIP), 2016, pp. 1022-1026.
Kai Wang et al., "Learning to Improve WLAN Indoor Positioning Accuracy Based on DBSCAN-KRF Algorithm From RSS Fingerprint Data", IEEE Access, vol. 7, 2019, pp. 72308-72315.
Xudong Song et al., "A Novel Convolutional Neural Network Based Indoor Localization Framework With WiFi Fingerprinting", IEEE Access, vol. 7, 2019, pp. 110698-110709.
Qianwen Ye et al., "CapsLoc: a Robust Indoor Localization System with WiFi Fingerprinting Using Capsule Networks", ICC 2020— 2020 IEEE International Conference on Communications (ICC), 2020, 8 pages.

* cited by examiner

BEAM DOMAIN BASED LOCALIZATION SYSTEM AND METHOD AND NON-TRANSITORY COMPUTER READABLE MEDIUM

RELATED APPLICATION

This application claims priority to Taiwan application Serial Number 111112700, filed Mar. 31, 2022, which is herein incorporated by reference.

BACKGROUND

Field of Invention

The present invention relates to systems and methods, and more particularly, beam domain based localization systems and methods.

Description of Related Art

Most of the existing fingerprint indoor localization technologies use received signal strength indication (RSSI) or channel state information (CSI) as reference indicators. Although the fingerprint indoor localization technology using RSSI information has low complexity, it needs to use multiple base stations/wireless access points can provide localization service for a device, and its accuracy is easily affected by the weakening effect and multipath effect. The usage of the CSI information can provide better indoor localization performance, but requires higher system complexity.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

According to embodiments of the present disclosure, the present disclosure provides beam domain based localization systems and methods, to solve or circumvent aforesaid problems and disadvantages in the related art.

An embodiment of the present disclosure is related to a beam domain based localization system, and the beam domain based localization system includes a wireless transceiver and a computer device. The computer device electrically connected to the wireless transceiver, and the computer device configured for: obtaining a beam selection result associated with a mobile device through the wireless transceiver; locating the mobile device according to the beam selection result.

In one embodiment of the present disclosure, the beam selection result collects a beam received power matrix when the wireless transceiver provides a communication service to the mobile device and uses the beam received power matrix as a spatial feature of the mobile device, and the computer device transforms the beam selection result into a beam domain received power map associated with the mobile device and then locates the mobile device based on the beam domain received power map.

In one embodiment of the present disclosure, the computer device establishes a fingerprinting database and a deep learning model in a training phase, and the fingerprinting database includes a plurality of beam domain received power maps, an autoencoder of the deep learning model performs a feature extraction and a feature training on the plurality of the beam domain received power maps to obtain information of a latent space and uses the information of the latent space as an input of a predictor of the deep learning model, thereby increasing an accuracy of a location prediction of the predictor.

In one embodiment of the present disclosure, the computer device transforms a plurality of input beam selection data into the plurality of the beam domain received power maps in the training phase, and the plurality of the beam domain received power maps serve as a basis of training of the deep learning model.

In one embodiment of the present disclosure, after the training phase is finished, the computer device uses the deep learning model to locate the mobile device according to the beam domain received power map associated with the mobile device.

Another embodiment of the present disclosure is related to a beam domain based localization method, and the beam domain based localization method includes steps of: obtaining a beam selection result associated with a mobile device through a wireless transceiver; and locating the mobile device according to the beam selection result.

In one embodiment of the present disclosure, the beam selection result collects a beam received power matrix when the wireless transceiver provides a communication service to the mobile device and uses the beam received power matrix as a spatial feature of the mobile device, and the step of locating the mobile device includes: transforming the beam selection result into a beam domain received power map associated with the mobile device and then locating the mobile device based on the beam domain received power map.

In one embodiment of the present disclosure, the beam domain based localization method further includes: establishing a fingerprinting database and a deep learning model in a training phase, and the fingerprinting database includes a plurality of beam domain received power maps; using an autoencoder of the deep learning model to perform a feature extraction and a feature training on the plurality of the beam domain received power maps to obtain information of a latent space; using the information of the latent space serving as an input of a predictor of the deep learning model, thereby increasing an accuracy of a location prediction of the predictor.

In one embodiment of the present disclosure, the beam domain based localization method further includes: transforming a plurality of input beam selection data into the plurality of the beam domain received power maps in the training phase, and using the plurality of the beam domain received power maps as a basis of training of the deep learning model.

In one embodiment of the present disclosure, the beam domain based localization method further includes: using the deep learning model to locate the mobile device according to the beam domain received power map associated with the mobile device after the training phase is finished.

Yet another embodiment of the present disclosure is related to a non-transitory computer readable medium to store a plurality of instructions for commanding a computer to execute a beam domain based localization method, and the beam domain based localization method includes steps of: obtaining a beam selection result associated with a mobile device through a wireless transceiver; and locating the mobile device according to the beam selection result.

In view of the above, according to the present disclosure, the beam domain based localization system and the beam domain based localization method have the characteristics of low system complexity, and can only use a single wireless transceiver (e.g., a base station, a wireless access point, etc.) to provide accurate localization services to the mobile device. Moreover, the present disclosure can be extended to use multiple wireless transceivers to further improve the localization accuracy.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
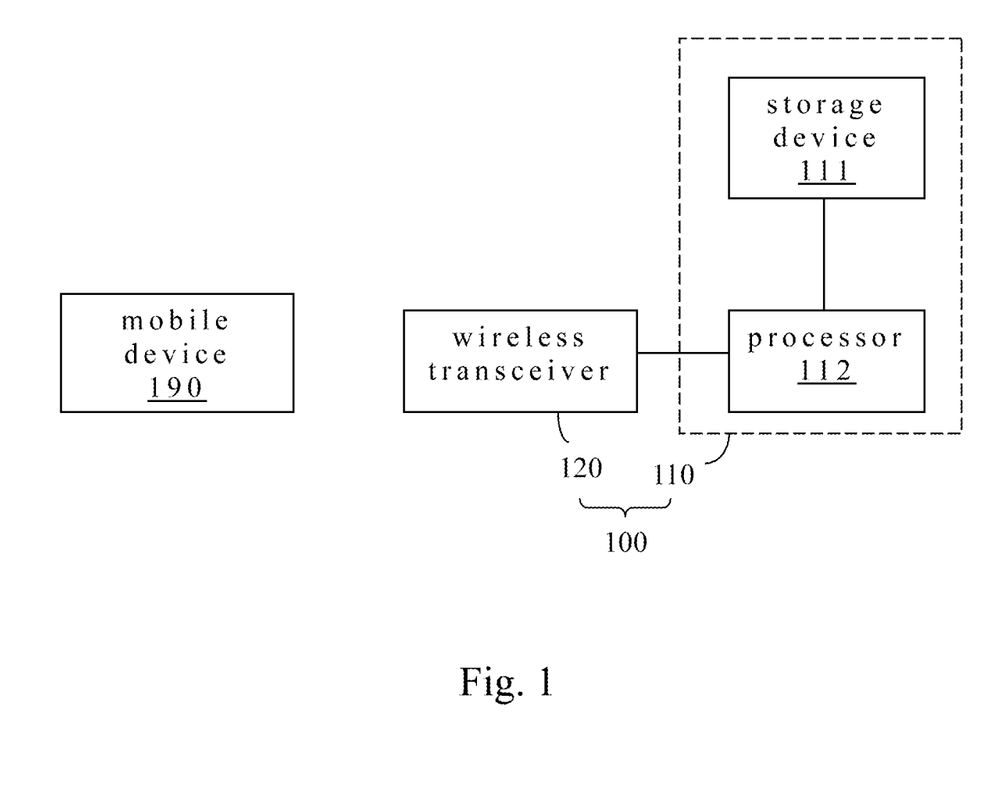
FIG. 1 is a block diagram of a beam domain based localization system according to one embodiment of the present disclosure.

Referring to FIG. 1. In one aspect, the present disclosure is directed to a beam domain based localization system 100. This system may be easily integrated into a beam domain indoor localization technology of multi-antenna systems and may be applicable or readily adaptable to all technologies. Accordingly, the beam domain based localization system 100 has advantages. Herewith the beam domain based localization system 100 is described below with FIG. 1.

The subject disclosure provides the beam domain based localization system 100 in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

FIG. 1 is a block diagram of the beam domain based localization system 100 according to one embodiment of the present disclosure. As shown in FIG. 1, the beam domain based localization system 100 includes a wireless transceiver 120 and a computer device 110. In structure, the computer device 110 is electrically connected to the wireless transceiver 120. It should be noted that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. For example, the computer device 110 may be a built-in control circuit that is directly connected to the wireless transceiver 120, or the computer device 110 may be an external server that is indirectly connected to the wireless transceiver 120 through the network.

In practice, for example, the wireless transceiver 120 can be a base station, a wireless access point, a multi-antenna communication device, or the like.

In practice, for example, the computer device 110 can be a built-in control circuit of the wireless transceiver 120, a server disposed outside the wireless transceiver 120, a computer host or other computer equipment. The server can be remotely managed in a manner that provides accessibility, consistency, and efficiency. Remote management removes the need for input/output interfaces in the servers. An administrator can manage a large data centers containing numerous rack servers using a variety of remote management tools, such as simple terminal connections, remote desktop applications, and software tools used to configure, monitor, and troubleshoot server hardware and software.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As shown in FIG. 1, the computer device 110 includes a storage device 111 and a processor 112. For example, the storage device 111 can be a hard disk, a flash storage device or another storage medium, and the processor 112 can be a central processing unit, a controller or another circuit. In structure, the storage device 111 is electrically connected to the processor 112. In use, the storage device 111 can store the beam domain received power map (BDRPM), program instructions and other information, and the processor 112 can execute the program instructions to implement beam domain based localization methods (e.g., a location prediction, a depth learning, etc.).

In one embodiment of the present disclosure, the computer device 110 obtains a beam selection result associated with a mobile device 190 (e.g., a mobile phone, an electronic tag, etc.) through the wireless transceiver, and the computer device 110 locates the mobile device 190 according to the beam selection result. Thus, the beam domain based localization system 100 have the characteristics of low system complexity, and can only use a single wireless transceiver 120 (e.g., a base station, a wireless access point, etc.) to provide accurate localization services to the mobile device. Moreover, the present disclosure can be extended to use multiple wireless transceivers 120 to further improve the localization accuracy.

Figure 2A:
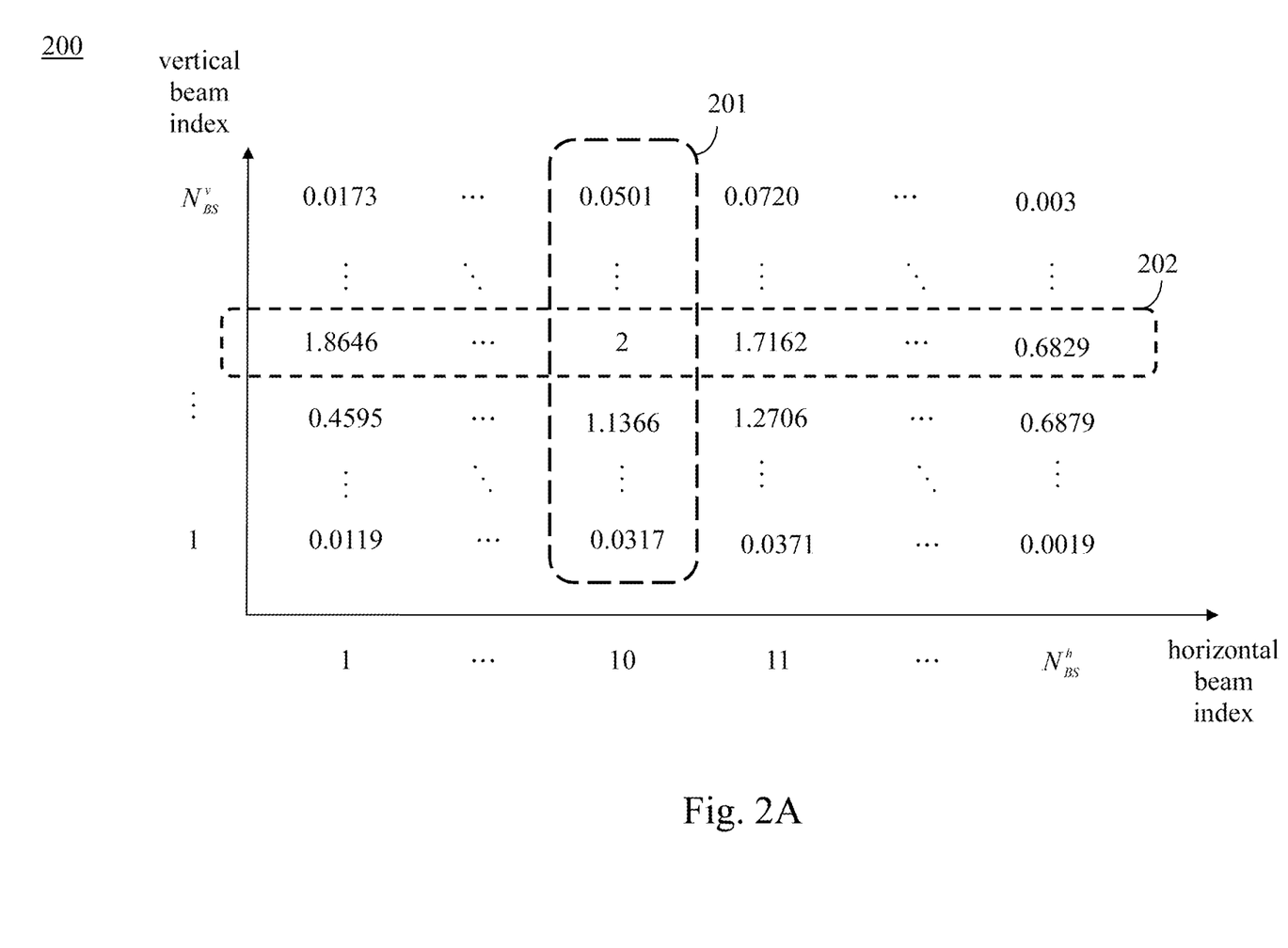
FIG. 2A is a beam received power matrix according to one embodiment of the present disclosure.
Figure 2B:
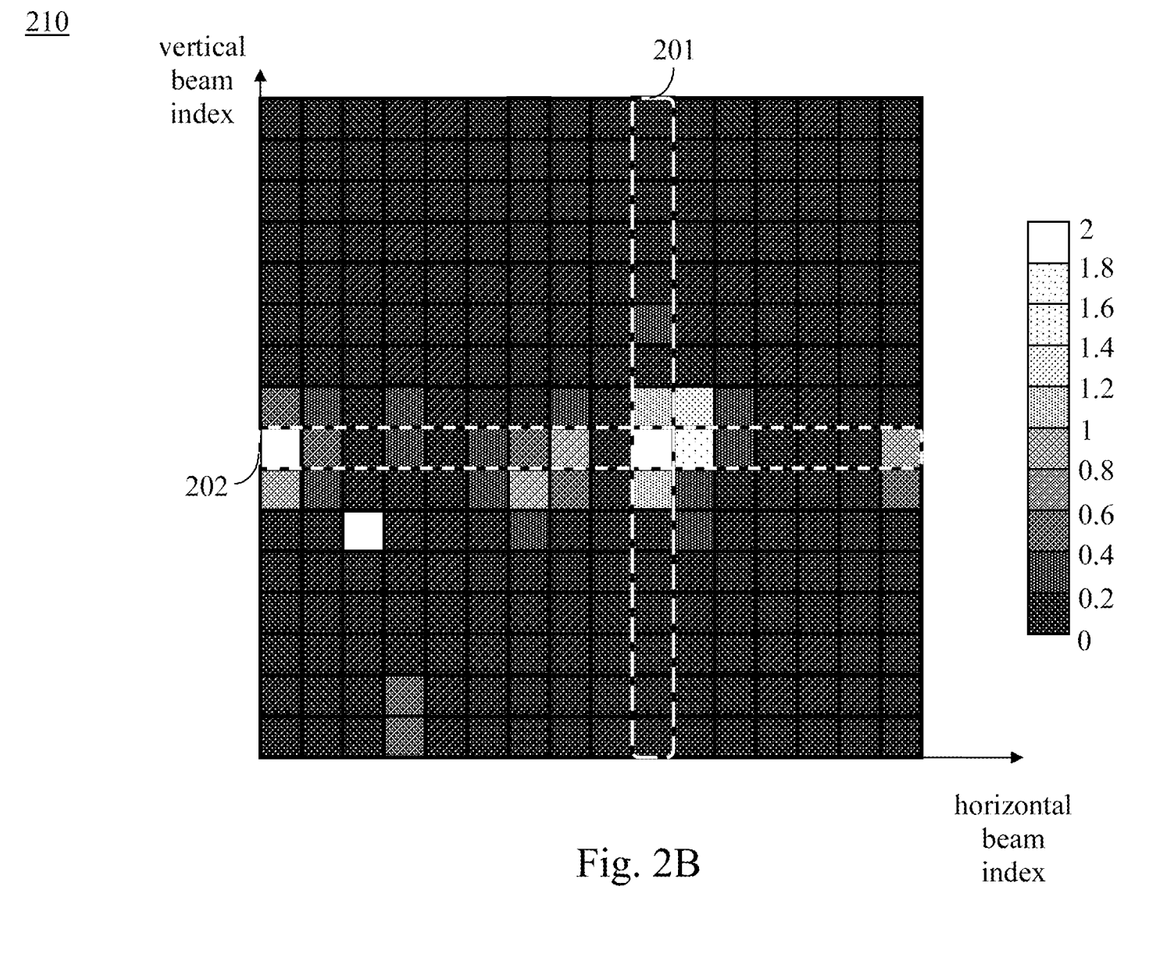
FIG. 2B is a beam domain received power map transformed from the beam received power matrix of FIG. 2A.

For a more complete understanding of the beam selection result, refer to FIG. 1, FIG. 2A and FIG. 2B. FIG. 2A is a beam received power matrix 200 according to one embodiment of the present disclosure. FIG. 2B is a beam received power map 210 transformed from the beam received power matrix 200 of FIG. 2A. It should be noted that, in order to simplify the diagram, in the following different embodiments, for example, the beam domain received power map 210 in the training phase or the testing phase of deep learning can be taken as an example to assist in the description. The input beam selection data in the training phase or the beam received power matrix in the testing phase can be taken as an example of the beam received power matrix 200 to assist in the description.

In one embodiment of the present disclosure, the beam selection result collects the beam received power matrix 200 when the wireless transceiver 120 provides a communication service to the mobile device 190 and uses the beam received power matrix 200 as a spatial feature of the mobile device, and the computer device 110 transforms the beam selection result into the beam domain received power map 210 associated with the mobile device 190 and then locates the mobile device 190 based on the beam domain received power map 210.

In practice, for example, the beam domain received power map 210 uses different colors or gray-scale intensities to represent numerical ranges of different received powers, so as to facilitate subsequent deep learning. For example, the row 201 and the column 202 in the beam received power matrix 200 correspond to the location of the mobile device 190, and therefore the row 201 and the column 202 in the beam domain received power map 210 also correspond to the location of the mobile device 190.

Figure 3:
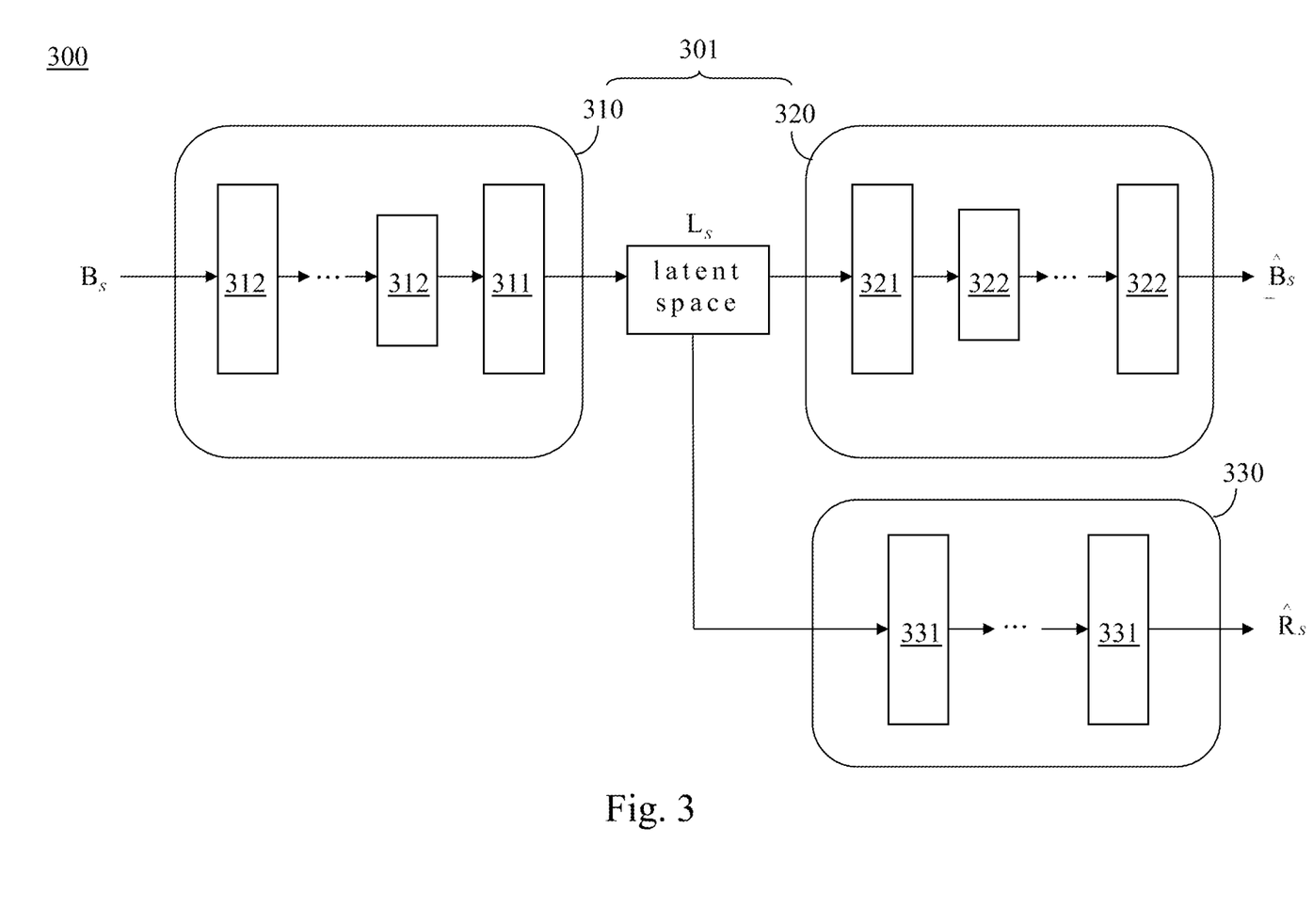
FIG. 3 is a block diagram of a deep learning model according to one embodiment of the present disclosure.

For a more complete understanding of the deep learning, refer to FIG. 3. FIG. 3 is a block diagram of a deep learning model 300 according to one embodiment of the present disclosure. In one embodiment of the present disclosure, the computer device 110 establishes a fingerprinting database and the deep learning model 300 in the training phase, and the fingerprinting database includes a BDRPM set (e.g., a plurality of beam domain received power maps). An autoencoder 301 of the deep learning model 300 performs a feature extraction and a feature training on the plurality of the beam domain received power maps $B_s$ to obtain information of a latent space $L_s$ and uses the information of the latent space $L_s$ as an input of a predictor 330 of the deep learning model 300, thereby increasing an accuracy of a location prediction of the predictor 330.

As to above BDRPM set, in one embodiment of the present disclosure, the computer device 110 transforms a plurality of input beam selection data into the plurality of the beam domain received power maps in the training phase, where the plurality of the beam domain received power maps serve as a basis of training of the deep learning model 300. In practice, for example, the input beam selection data include but not limited to raw data, or the input beam selection data can be information after weight training or other data processing. Deep learning algorithms include but are not limited to software, hardware, another algorithm known to assist in machine learning, artificial intelligence, deep learning, neural-like networks, other equivalent algorithms, mathematical formulas, or determination methods.

Moreover, in one embodiment of the present disclosure, after the training phase is finished, the computer device 100 uses the deep learning model 300 to locate the mobile device 190 according to the beam domain received power map 210 associated with the mobile device 190.

Figure 4:
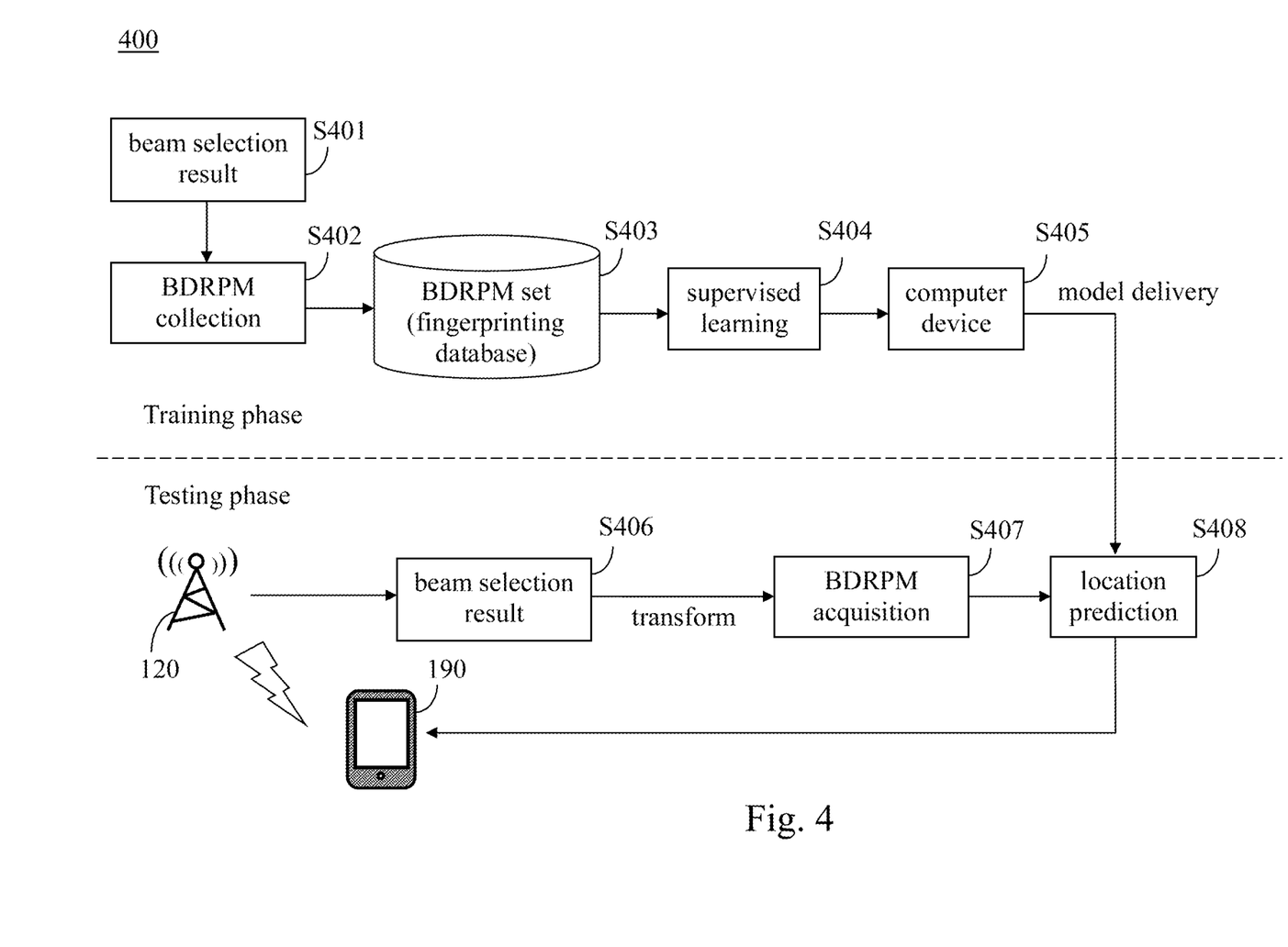
FIG. 4 is a flow chart of a beam domain based localization method according to one embodiment of the present disclosure.

For a more complete understanding of a beam domain based localization method performed by the beam domain based localization system 100, referring FIGS. 1-4, FIG. 4 is a flow chart of the beam domain based localization method 400 according to one embodiment of the present disclosure. As shown in FIG. 4, the beam domain based localization method 400 includes operations S401 to S408. However, as could be appreciated by persons having ordinary skill in the art, for the steps described in the present embodiment, the sequence in which these steps are performed, unless explicitly stated otherwise, can be altered depending on actual needs; in certain cases, all or some of these steps can be performed concurrently.

The beam domain based localization method 400 may take the form of a computer program product on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as SRAM, DRAM, and DDR-RAM; optical storage devices such as CD-ROMs and DVD-ROMs; and magnetic storage devices such as hard disk drives and floppy disk drives.

The embodiment of the beam domain based localization method 400 takes indoor localization applications as an example, but is not limited to indoor localization applications. The wireless transceiver 120 (e.g., the base station/the wireless access point) can provide the mobile device 190 with the localization service while providing the communication service to the mobile device 190. By using the result of beam selection by the wireless transceiver 120, the beam domain based localization method 400 can utilize the beam selection result to provide the mobile device 190 with the localization service while providing the communication service to the mobile device 190. The present disclosure can use a single wireless transceiver 120 to achieve an accurate indoor localization, and the present disclosure can also extend to use multiple wireless transceivers 120 to further improve positioning accuracy. The beam domain based localization method 400 roughly includes four parts: the collection of beam domain received power maps $B_s$, the training of the autoencoder 301, the training of the predictor 330, and the localization prediction of the mobile device 190, where the autoencoder 301 may include an encoder 310 and a decoder 320. The beam selection result is transformed into the beam domain received power maps $B_s$ as the spatial features of the mobile device 190 and the input information of the subsequent positioning model (e.g., the deep learning model). The beam domain received power maps $B_s$ are input to the autoencoder 301 for weighting training. The information of the latent space of the autoencoder 301 $L_s$ is input to the predictor 330 for weight training. The location prediction of the mobile device 190 is performed through the trained autoencoder 301 and the trained predictor 330. The autoencoder 301 transforms the beam domain received power maps into the information of the latent space with more spatial characteristics, and the information of the latent space with more spatial characteristics can be used as the input information of the predictor 330, so as to accurately predict the location of mobile device 190.

The processes of beam domain based localization method 400 can be roughly divided into two phases: the training phase and the testing phase. In the training phase, the beam selection result is collected as the spatial feature (i.e., a fingerprint) of a location of the mobile device 190, where the mobile device 190 is disposed at the location in space. The collected beam selection result is transformed into the beam domain received power map as the input information of the encoder 310. In order to accelerate the convergence speed of the encoder 301 and the predictor 330, the beam domain based localization method 400 normalizes and preprocesses the data of the beam domain received power maps, and then the preprocessed beam domain received power map data are input to the autoencoder 301 for training. The autoencoder 301 transforms the features of aforesaid data into the information of the latent space with more spatial characteristics, so that the predictor 330 can be more easily converged. After the training of the autoencoder 301 and the predictor 330 in the training phase is finished, the prediction service of the mobile device 190 can be provided in the test phase.

In the training phase, in operation S401, a plurality of input beam selection data is obtained. In practice, for example, the plurality of input beam selection data can be different beam selection results corresponding to different locations of the mobile device 190.

Then, in operation S402, the plurality of input beam selection data are transformed into a plurality of beam domain received power maps, so as to complete the collection of the plurality of beam domain received power maps.

Regarding the collection of beam domain received power maps, the wireless transceiver 120 uses a predefined three-dimensional (3D) codebook for beamforming, and constructs a three-dimensional beam by combining horizontal beams and vertical beams. The number of horizontal and vertical beams are represented as $N_{BS}^h$ and $N_{BS}^v$ respectively (as shown in FIG. 2A), and therefore the 3D codebook size is $N_{BS}=N_{BS}^h \times N_{BS}^v$. When the wireless transceiver 120 selects different beams from the 3D codebook to provide the communication service to the mobile device 190, the mobile device 190 has different received powers because the different beams used have different directivities and different channel transmission characteristics. In order to provide the mobile device 190 with the best communication service quality, the wireless transceiver 120 usually selects the beam with the maximum received power to perform the communication service for the mobile device 190. Therefore, the beam domain based localization method 400 uses the collected beam received power matrix as the spatial feature of the mobile device 190 of the user in the indoor space when the communication service is provided for the mobile device 190. The beam domain based localization method 400 transforms the collected beam received power matrix into the beam domain received power map 210 (shown in FIG. 2B). In this way, after the mobile device 190 completes the beam selection, the beam domain received power map is obtained through above transforming process. It is observed that a special relationship between the beam domain received power map and the indoor spatial position of the mobile device 190. Therefore, the beam domain based localization method 400 uses the beam domain received power map as the spatial feature for subsequent operations.

In operation S403, the fingerprinting database is established, which includes the BPRPM set (i.e., the plurality of the beam domain received power maps) that is used as a basis of subsequent training of the deep learning model. In operation S404, the deep learning model 300 is established to implement supervised learning. In operation S405, the computer device 110 is used for training, in which the autoencoder 301 of the deep learning model performs the feature extraction and feature training on the plurality of the beam domain received power maps to obtain information of the latent space $L_s$, and the information of the latent space $L_s$ serves as an input of a predictor 330 of the deep learning model 300, thereby increasing an accuracy of the location prediction of the predictor 330. In this way, the computer device 110 generates the trained deep learning model 300.

Regarding the training of the autoencoder 301, the wireless transceiver 120 uses the 3D codebook for beam selection when serving the mobile device 190. Therefore, the beam domain based localization method 400 can obtain the beam received power matrix through the beam selection mechanism and then can transform the beam received power matrix into a beam domain received power map $B_s$, where the beam domain received power map $B_s$ can be viewed as a special image describing spatial characteristics. The present disclosure proposes the deep learning model 300, such as a convolutional autoencoder neural network (CAR-Net). The deep learning model 300 mainly includes the encoder 310, a decoder 320 and the predictor 330. Therefore, the deep learning model 300 can include three parts: the encoder 310, the decoder 320, and the predictor 330, as shown in FIG. 3. Since the beam domain received power map is a two-dimensional image, the beam domain based localization method 400 uses a two-dimensional convolutional neural network (2DCNN) as the basic structure of the deep learning model 300. The encoder 310 includes a plurality of two-dimensional convolutional neural networks 312 and a maximum pooling layer 311. The decoder 320 includes an upsampling layer 321 and a plurality of two-dimensional convolutional neural networks 322. The architecture of the encoder 310 and the decoder 320 performs the feature extraction and the feature training on the beam domain received power map $B_s$. With the architecture of the encoder 310 and the decoder 320, the beam domain based localization method 400 can obtain the information of the latent space $L_s$ with more spatial characteristics, and the information of the latent space $L_s$ serves as the input of the predictor 330.

The operation of the encoder 310 satisfies the following relationship: $L_s=f_e(B_s)$, where $f_e(\ )$ is the function of the encoder 310.

The operation of the decoder 320 satisfies the following relationship: $\hat{B}_s=f_d(L_s)$, where $f_d(\ )$ is the function of the decoder 320, and $\hat{B}_s$ is the result of restoring the beam domain received power map.

Regarding the training of the predictor 330, in this embodiment, the mobile device 190 can exist anywhere in the indoor space, and the beam domain based localization method 400 formulates the indoor localization problem as a regression problem. The information of latent space $L_s$ extracted by the encoder 310 is input to the predictor 330 constructed by fully connected layers 331, and the location prediction of the mobile device 190 is performed to obtain the predicted coordinate position $\hat{Re}_s$ of the mobile device 190.

The operation of the predictor 330 satisfies the following relationship: $\hat{R}_s=f_r(vec(L_s))$, where $f_r(\ )$ is the function of the predictor 330, and $vec(\ )$ is a vectorization operation.

The loss parameter of the deep learning model 300 satisfies the following relationship: $L_S(R_S, B_S)=\lambda_B MSE_B(B_S)+\lambda_R MSE_L(R_S)$, where $\lambda_B$ and $\lambda_R$ are the hyperparameters of the restored beam domain received power map and the hyperparameters of the location prediction respectively, $MSE_B(B_s)$ and $MSE_L(R_s)$ are the loss function of the restored beam domain received power map and the loss function of the location prediction respectively, $MSE_B(B_s)=\|\hat{B}_s-B_s\|_F^2$, and $MSE_L(R_s)=\|\hat{R}_s-R_s\|^2$.

After the training phase is finished, in the testing phase, in short, in the beam domain based localization method 400, the beam selection result associated with the mobile device 190 is obtained through the wireless transceiver 120, and the mobile device 190 is located according to the beam selection result.

Specifically, in the testing phase, in operation S406, the beam selection result associated with the mobile device 190 is obtained through the wireless transceiver 120. In one embodiment of the present disclosure, the beam selection result collects the beam received power matrix when the wireless transceiver 120 provides a communication service to the mobile device 190 and uses the beam received power matrix as the spatial feature of the mobile device 190. In operation S407, the beam selection result is transformed into a beam domain received power map associated with the mobile device 190.

Then, in operation S408, the location prediction is performed, which is based on the beam domain received power map to locate the mobile device 190. Specifically, in operation S408, the trained deep learning model is based on the beam domain received power map associated with the mobile device 190 to locate the mobile device 190.

Regarding the location prediction of the mobile device 190, in this embodiment, after the deep learning model 300 in the beam domain based localization method 400 is trained in the training phase, when the communication service is provided for the mobile device 190 in the testing phase, a real-time location prediction service can be provided for the mobile device 190 by using the beam domain received power map obtained by the beam selection mechanism.

In practice, for example, with the 5G internet of things (IoT), a large number of IoT devices are arranged, and many of them have valuable assets. In order to provide the location service while communicating with the mobile device 190, the beam domain based localization method 400 transforms the selection result of the beam mechanism into a two-dimensional image as an important feature of the device in space and introduces a deep learning mechanism to effectively identify the position of the device in space through the two-dimensional image. This localization technology can be performed simultaneously while providing the communication service for the mobile device 190, thereby improving the localization accuracy and the robustness to environmental changes.

In view of the above, according to the present disclosure, the beam domain based localization system 100 and the beam domain based localization method 400 have the characteristics of low system complexity, and can only use a single wireless transceiver 120 (e.g., a base station, a wireless access point, etc.) to provide accurate localization services to the mobile device. Moreover, the present disclosure can be extended to use multiple wireless transceivers 120 to further improve the localization accuracy.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A beam domain based localization system, comprising:
    a wireless transceiver; and
    a computer device electrically connected to the wireless transceiver, and the computer device configured for:
        establishing a fingerprinting database and a deep learning model in a training phase, wherein the fingerprinting database includes a plurality of first beam domain received power maps, and wherein an autoencoder of the deep learning model performs a feature extraction and a feature training on the plurality of first beam domain received power maps to obtain information of a latent space and uses the information of the latent space as an input of a predictor of the deep learning model, thereby increasing an accuracy of a location prediction of the predictor;
        obtaining a beam selection result associated with a mobile device through the wireless transceiver, wherein the beam selection result collects a beam received power matrix when the wireless transceiver provides a communication service to the mobile device and uses the beam received power matrix as a spatial feature of the mobile device;
        transforming the beam selection result into a second beam domain received power map associated with the mobile device; and
        locating the mobile device based on the second beam domain received power map.

2. The beam domain based localization system of claim 1, wherein the computer device transforms a plurality of input beam selection data into the plurality of first beam domain received power maps in the training phase, and the plurality of first beam domain received power maps serve as a basis of training of the deep learning model.

3. The beam domain based localization system of claim 1, wherein after the training phase is finished, the computer device uses the deep learning model to locate the mobile device according to the second beam domain received power map associated with the mobile device.

4. A beam domain based localization method, comprising steps of:
    establishing a fingerprinting database and a deep learning model in a training phase, wherein the fingerprinting database includes a plurality of first beam domain received power maps;
    using an autoencoder of the deep learning model to perform a feature extraction and a feature training on the plurality of first beam domain received power maps to obtain information of a latent space;
    using the information of the latent space as an input of a predictor of the deep learning model, thereby increasing an accuracy of a location prediction of the predictor;
    obtaining a beam selection result associated with a mobile device through a wireless transceiver, wherein the beam selection result collects a beam received power matrix when the wireless transceiver provides a communication service to the mobile device and uses the beam received power matrix as a spatial feature of the mobile device;
    transforming the beam selection result into a second beam domain received power map associated with the mobile device; and
    locating the mobile device based on the second beam domain received power map.

5. The beam domain based localization method of claim 4, further comprising:
    transforming a plurality of input beam selection data into the plurality of first beam domain received power maps in the training phase, and using the plurality of first beam domain received power maps as a basis of training of the deep learning model.

6. The beam domain based localization method of claim 4, further comprising:
    using the deep learning model to locate the mobile device according to the second beam domain received power map associated with the mobile device after the training phase is finished.

7. A non-transitory computer readable medium to store a plurality of instructions for commanding a computer to execute a beam domain based localization method, and the beam domain based localization method comprising:

establishing a fingerprinting database and a deep learning model in a training phase, wherein the fingerprinting database includes a plurality of first beam domain received power maps;

using an autoencoder of the deep learning model to perform a feature extraction and a feature training on the plurality of first beam domain received power maps to obtain information of a latent space;

using the information of the latent space as an input of a predictor of the deep learning model, thereby increasing an accuracy of a location prediction of the predictor;

obtaining a beam selection result associated with a mobile device through a wireless transceiver, wherein the beam selection result collects a beam received power matrix when the wireless transceiver provides a communication service to the mobile device and uses the beam received power matrix as a spatial feature of the mobile device;

transforming the beam selection result into a second beam domain received power map associated with the mobile device; and locating the mobile device based on the second beam domain received power map.

8. The non-transitory computer readable medium of claim 7, wherein the beam domain based localization method further comprises:

transforming a plurality of input beam selection data into the plurality of first beam domain received power maps in the training phase, and using the plurality of first beam domain received power maps as a basis of training of the deep learning model.

9. The non-transitory computer readable medium of claim 7, wherein the beam domain based localization method further comprises:

using the deep learning model to locate the mobile device according to the second beam domain received power map associated with the mobile device after the training phase is finished.

* * * * *